(12) United States Patent
Morikawa et al.

(10) Patent No.: US 7,501,139 B2
(45) Date of Patent: Mar. 10, 2009

(54) METHOD AND AN APPARATUS FOR SHAPING A DOUGH PIECE

(75) Inventors: Michio Morikawa, Utsunomiya (JP); Sadao Ueno, Utsunomiya (JP)

(73) Assignee: Rheon Automatic Machinery Co., Ltd., Tochigi-Ken (JP)

( * ) Notice: Subject to any disclaimer, the term of this patent is extended or adjusted under 35 U.S.C. 154(b) by 240 days.

(21) Appl. No.: 10/369,554

(22) Filed: Feb. 21, 2003

(65) Prior Publication Data

US 2003/0185927 A1 Oct. 2, 2003

(30) Foreign Application Priority Data

Apr. 2, 2002 (JP) ............................. 2002-100275

(51) Int. Cl.
*A21C 3/02* (2006.01)
(52) U.S. Cl. ................. 426/231; 426/502; 426/517; 425/367; 100/168
(58) Field of Classification Search ............... 426/451, 426/502, 516, 517, 231; 425/367, 363; 100/168
See application file for complete search history.

(56) References Cited

U.S. PATENT DOCUMENTS

| | | | | |
|---|---|---|---|---|
| 3,427,004 A | * | 2/1969 | Cover et al. ............... 366/218 |
| 3,991,665 A | * | 11/1976 | Lang-Ree et al. ........... 99/441 |
| 4,877,632 A | * | 10/1989 | Vinas I Nogueroles ...... 426/502 |
| 4,957,426 A | * | 9/1990 | Hayashi ..................... 425/367 |
| 5,030,466 A | * | 7/1991 | Kageyama et al. .......... 426/502 |
| 5,733,589 A | * | 3/1998 | Oki ........................ 425/364 R |
| 5,783,218 A | * | 7/1998 | Morikawa ................... 425/101 |
| 5,843,510 A | * | 12/1998 | Hayashi ..................... 426/502 |
| 6,126,431 A | * | 10/2000 | Hayashi ..................... 425/363 |
| 6,155,814 A | * | 12/2000 | Hayashi ..................... 425/363 |
| 6,171,629 B1 | * | 1/2001 | Morikawa ................... 426/502 |
| 6,322,345 B1 | * | 11/2001 | Zaltron ...................... 425/363 |

FOREIGN PATENT DOCUMENTS

| | | | |
|---|---|---|---|
| EP | 0 329 398 | | 8/1989 |
| EP | 0 353 036 | | 1/1990 |
| FR | 2571932 | * | 10/1985 |
| FR | 2 571 932 | | 4/1986 |
| JP | 54-991 | * | 1/1979 |
| JP | 2860938 | | 12/1998 |
| SU | 1400576 | * | 6/1988 |
| SU | 1400576 A | * | 6/1988 |

* cited by examiner

*Primary Examiner*—Drew E Becker
(74) *Attorney, Agent, or Firm*—Finnegan, Henderson, Farabow, Garrett & Dunner, L.L.P.

(57) ABSTRACT

An apparatus for stretching and rolling a mass of a strip of food dough to form a dough sheet is disclosed. A first conveyor (15) continuously conveys a mass of a strip of dough (9) along a traveling direction that is parallel to the mass of the strip of the dough (9). The incoming mass of the strip of dough (9) passes between and through a primary roller (11) and a secondary roller (13), which is opposed to and spaced apart from the primary roller (11) such that the incoming mass of the strip of dough is stretched and rolled into the form of a dough sheet.

3 Claims, 7 Drawing Sheets

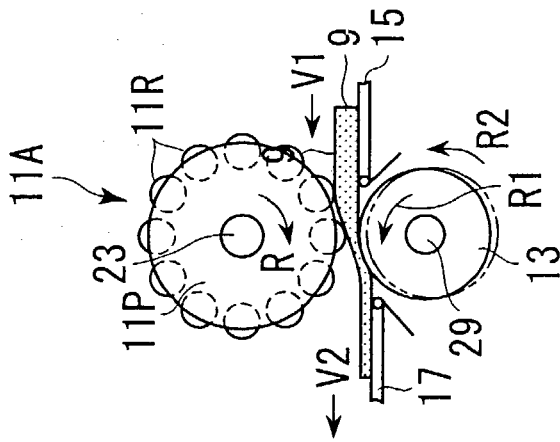
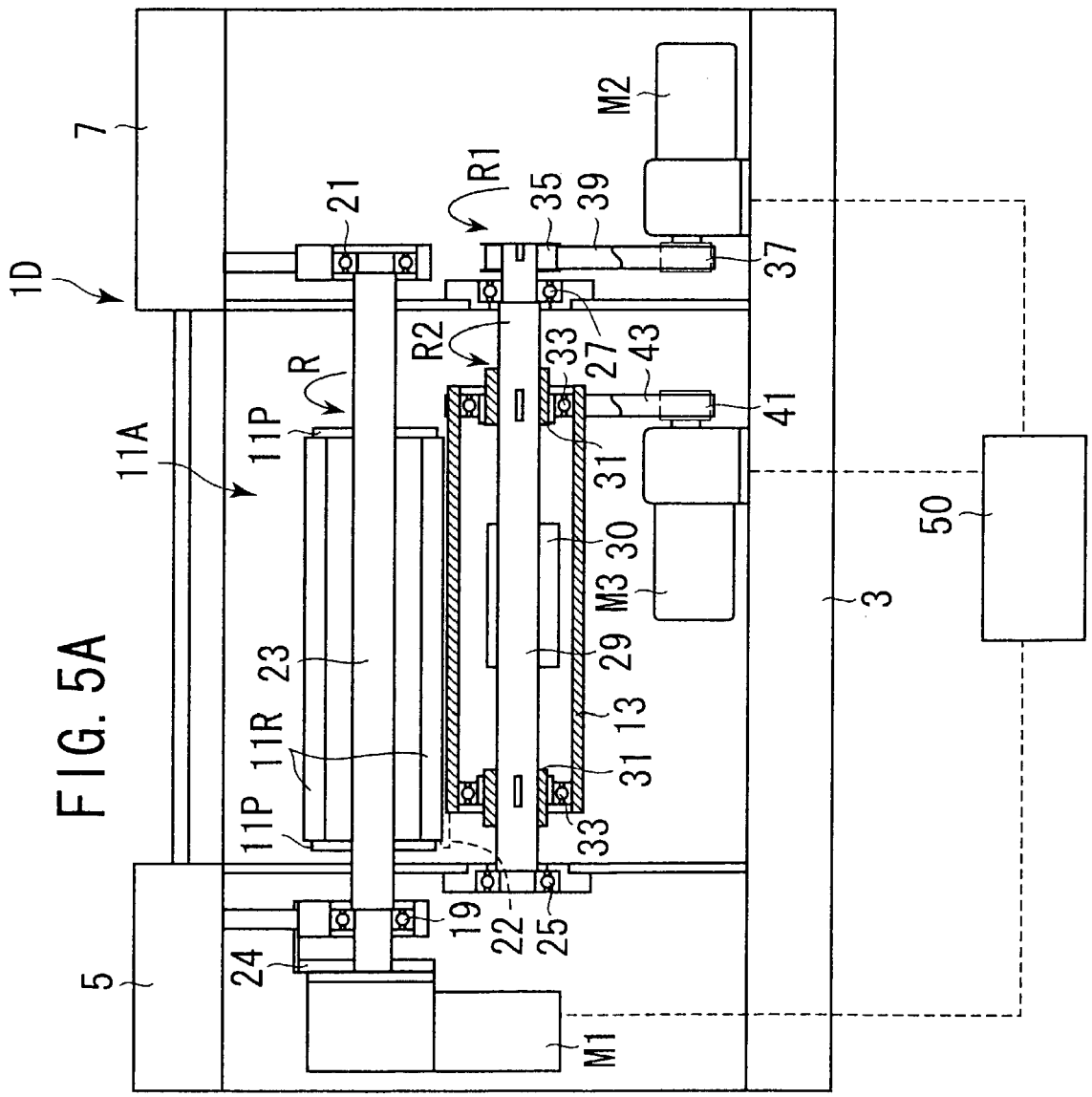
FIG. 5A
FIG. 5B

METHOD AND AN APPARATUS FOR SHAPING A DOUGH PIECE

FIELD OF THE INVENTION

This invention generally relates to a method and apparatus for stretching a mass of a strip of dough consisting of food item(s), such as bread dough, to form a dough sheet. More specifically, the invention provides such an apparatus in a simple form that allows the mass of the strip of dough to be readily stretched to form a dough sheet.

DESCRIPTION OF THE PRIOR ART

Attempts have been made, for example, to spread a mass of a strip of dough consisting of food item(s), such as bread dough, to form a dough sheet. A conventional stretching apparatus is disclosed in Japanese Patent No. 2860988 (Japanese Early-Publications No 10-075705) and Japanese Patent Publication No. 54-991.

In the conventional stretching apparatus, a mass of a strip of bread dough is conveyed on a conveyor belt. Above the conveyor belt a planet roller group, which includes a chain of rollers, is rolled along in the direction of its motion, like a wheel. The planet roller group s arranged such that its only preceding segment, which is located immediately above the conveyor belt, travels along in the direction that the conveyor belt is traveling, while a passage between them is formed.

As the mass of the strip of bread dough on the conveyor is brought into the passage under the preceding segment of the planet roller group, each roller of the preceding segment continuously rolls and stretches the mass of the strip of bread dough to form a bread dough sheet.

Although the conventional stretching apparatus can successfully spread the mass of the strip of bread dough to form a sheet, it requires a complex construction that includes the chain of the rollers arranged like a wheel.

Accordingly, it is an object of the present invention to provide a novel stretching apparatus in a simplified form that allows readily stretching a mass of a strip of dough to form a dough sheet.

It is another object of the present invention to provide a method for stretching a mass of a strip of dough to form a dough sheet in a simplified manner.

SUMMARY OF THE INVENTION

The present invention addresses the aforementioned needs by providing a method for stretching and rolling a mass of a strip of food dough to form a dough sheet. The method comprises the steps of providing at least one primary elongated roller and at least one secondary elongated roller, which are both substantially orthogonal to the lengthwise direction of the mass of the strip of food dough, and opposed to each other so as to provide a gap therebetween for receiving the incoming mass of the strip of dough, and vibrating at least one of the primary elongated roller and the secondary elongated roller such that at least one elongated roller is opposed to and spaced apart from the corresponding elongated roller, whereby the incoming mass of the strip of food dough in the gap is stretched and rolled to form a dough sheet.

The present invention also addresses the aforementioned needs by providing an apparatus for stretching and rolling a mass of a strip of food dough to form a dough sheet. The apparatus includes a first conveying means for continuously conveying the mass of the strip of food dough thereon along a traveling direction that is substantially parallel to the length of the mass of the strip of food dough. At least one primary elongated roller and at least one secondary elongated roller, which are substantially orthogonal to the direction of travel, are opposed to each other so as to provide a gap therebetween for receiving the incoming mass of the strip of dough from the first conveying means. A vibrating means vibrates at least one of the primary elongated roller and the secondary elongated rotating roller such that at least one elongated roller is opposed to and spaced apart from the corresponding elongated roller such that the incoming mass of the strip of food dough in the gap is stretched and rolled into a dough sheet. A second conveying means receives the dough sheet from the gap and conveys the dough sheet thereon.

Preferably, the primary elongated roller and the secondary elongated roller rotate in the traveling direction of the incoming dough.

The primary elongated roller and the secondary elongated roller maybe driven by separate motors or a common motor. The vibrating means may be driven by a separate motor or the common motor.

The vibrating means may alternate between using a first gap and a second gap, wherein a difference in size therebetween is a slight difference.

In one aspect of this invention, the apparatus further includes means for moving the incoming mass of the strip of food dough in the gap into at least one of the primary elongated roller and the secondary elongated roller such that the incoming dough slightly protrudes from and is slightly spaced apart from the at least one elongated rotating roller.

At least one of the primary elongated roller and the secondary elongated roller may include a plurality of planetary rollers, each of which turns as it moves in its orbit.

Additional features, advantages, and objectives of the invention will be set forth in the description which follows and in part will be apparent from the description, or may be learned by practicing the invention.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below serve to explain the principles of the invention.

FIG. 5A shows a schematic front view of the apparatus of the fourth embodiment of the present invention.

FIG. 5B shows a schematic side view of the primary and secondary rollers and the conveyors of the apparatus of FIG. 5A.

DESCRIPTION OF THE PREFERRED EMBODIMENTS

Figure 1A:
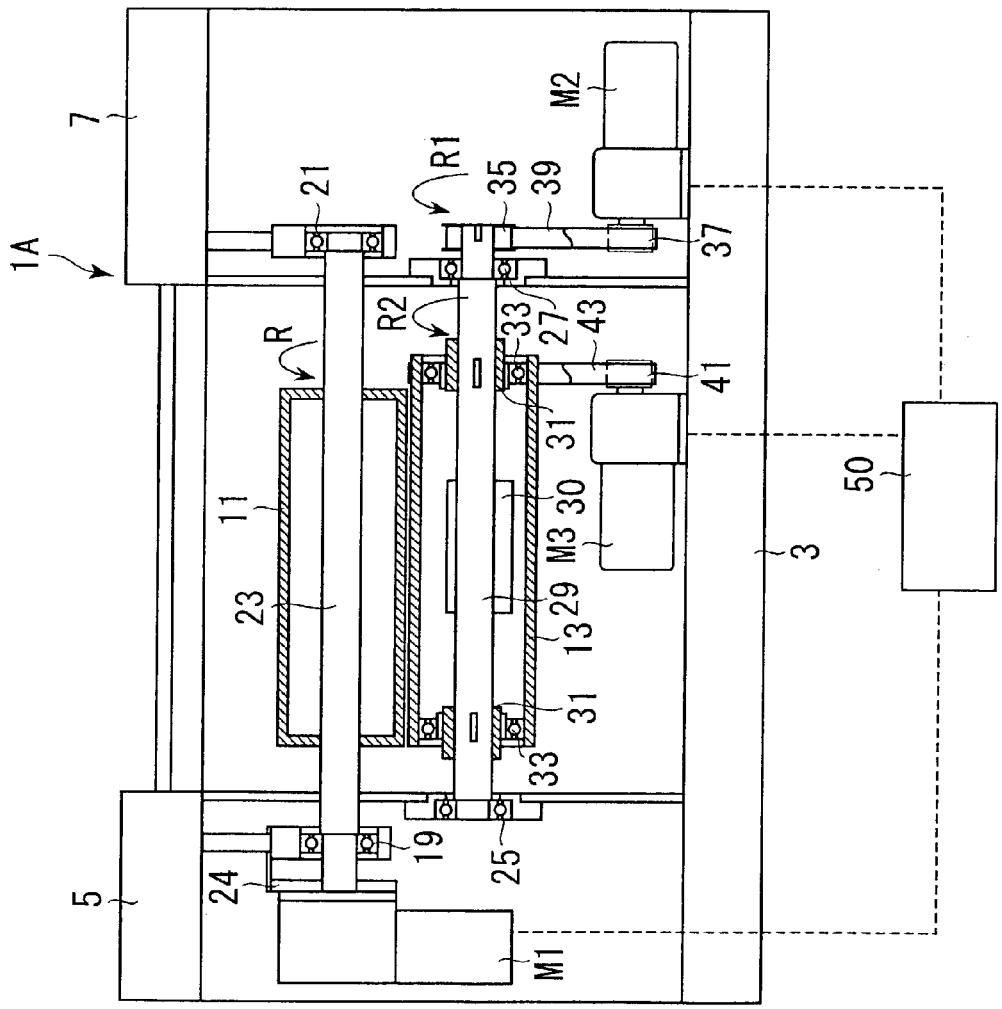
FIG. 1A shows a schematic front view of the apparatus of the first embodiment of the present invention.
Figure 1B:
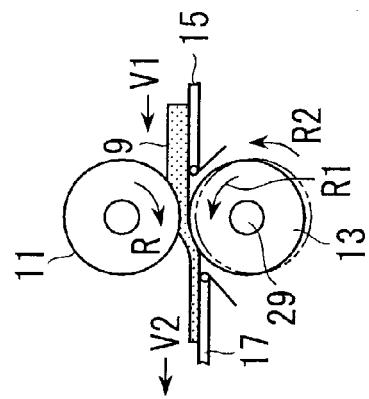
FIG. 1B shows a schematic side view of the rollers and conveyors of the apparatus of FIG. 1A.

Turning now to the drawings, wherein the same elements or similar functional elements are designated by like reference numerals, FIGS. 1A and 1B show the first embodiment of a stretching apparatus 1A of the present invention.

Although elongated dough 9 is continuously fed to the apparatus 1A, a piece of the elongated dough 9 has been kneaded and prepared as e.g., bread dough in the preceding section, with a known process apparatus (not shown), to be formed as a mass of a strip of dough.

Referring to FIG. 1A, the stretching apparatus 1A of the invention generally comprises a base 3, a pair of frameworks 5 and 7 that are fixedly located above the base 3, and a pair of opposing horizontal rollers located between the frameworks 5 and 7. The pair of opposing horizontal rollers consist of an upper elongated roller (primary roller) 11 for imparting primary pressure to the upper surface of the elongated dough 9, and a lower elongated roller (secondary roller) 13 for imparting secondary pressure to the under surface of the elongated dough 9.

The upper roller 11 and the lower roller 13 are rotatably mounted on the corresponding rotary shafts 23 and 29 such that their rotating surfaces are separated by a predetermined gap. This predetermined gap forms a passage for the dough 9 to be stretched, and reduces the thickness of it. In this embodiment the passage is a horizontal one, but it is not so limited.

As shown in FIG. 1B, the apparatus 1A also includes from its upstream end to its downstream end a first conveyor 15 and a second conveyor 17 (neither are shown in FIG. 1A) such that the opposing horizontal rollers 11 and 13 are located between them. The lengths of the rotary shafts 23 and 29 are orthogonal to the traveling direction of the first and second conveyors 15 and 17. The direction of the rotation of the rollers 11 and 13 is in the traveling direction of the conveyors 15 and 17. In the embodiment of FIG. 1B, the upper roller 11 is rotated clockwise, while the lower roller 13 is rotated counterclockwise, in order to stretch as well as reduce the thickness of the incoming dough 9 by passing it into a passage less than the initial thickness of the incoming dough 9.

In the embodiment, the traveling velocity of the first conveyor 15 is V1, and the traveling velocity of the second conveyor 17 is V2, where V2>V1. In FIG. 1A, although the elongated dough 9 is in the form of a mass of a strip of dough on the first conveyor 15, which is just ahead of the rollers 11 and 13, the elongated dough 9 is in the form of a sheet of dough on the second conveyor 17, since it is rolled, flattened, and spread by the rollers 11 and 13.

Referring to FIG. 1A again, both ends of the rotary shaft 23 of the upper horizontal roller 11 are rotatably supported by bearings 19 and 21, which are suspended from the frameworks 5 and 7. One end (at the bearings 19 side) of the rotary shaft 23 is coupled to a first motor M1, which is mounted on the framework 5, via a bracket 24. Thus the rotary shaft 23 and the upper roller 11 are rotatably driven by the first motor M1 as described above. The first motor M1 is preferably a variable velocity motor, such as a servomotor that can variably control the rotating velocity of the upper roller 11. In this case, the circumferential velocity of the upper roller 11 may be controlled to be substantially the same as the traveling velocity of the conveyors 15 and 17, to prevent undesired wrinkles or tears in the traveling mass of the strip of dough 9 under the upper roller 11.

The lower horizontal roller 13 can be swung such that it is opposed to and spaced apart from the upper horizontal roller 11.

In order to produce the swinging motion of the lower roller 13, one example of an arrangement is shown in FIG. 1A. Both ends of the rotary shaft 29 of the lower roller 13 are rotatably supported by the frameworks 5 and 7 via bearings 25 and 27. At the ends of the lower roller 13 the rotary shaft 29 has a pair of elements, e.g., eccentric bushings 31, to provide the eccentric motion about the rotary shaft 29. The eccentric bushings 31 support the lower roller 13 via bearings 33. At a suitable position on the rotary shaft 29 a balancer 30 is provided to stabilize the rotating motion of it. The function of the balancer 30 is to cancel the inertia of the swinging motion of the lower roller 13 caused by the eccentric bushings 31. In order to achieve this function, the balancer 30 is mounted on the rotary shaft 29 so as to provide a reversed phase with respect to the phase of the eccentric bushings 31. One end (at the bearing 27 side) of the rotary shaft 29 is coupled to a driven pulley 35. Under the driven pulley 35, a drive pulley 37 is coupled to a second motor M2 that is mounted on the base 3. The second motor M2 is drivingly coupled to the rotary shaft 29 via the drive pulley 37, a first endless belt 39 being entrained around the pulleys 35 and 37, and the driven pulley 35. Further, a third motor M3 is coupled to a drive pulley 41 and mounted on the base 3. The third motor M3 is drivingly coupled to the lower roller 13 via the drive pulley 41, and a second endless belt 43 is entrained around the drive pulley 41 and the lower roller 13.

The lower roller 13 is rotated counterclockwise by the third motor M3, while the rotary shaft 29 is rotated in the direction at a velocity that is much higher than that of the lower roller 13. Thus, the lower roller 13 can be frequently swung such that it is opposed to and spaced apart from the upper roller 11 during one rotation of it.

The velocities of the motors M1, M2, and M3 are controlled by a controller 50, which may be equipped with a control panel (not shown) on the apparatus 1A, or provided as a perpetual controller (not shown) such as a personal computer. The controller 50 transmits the rate for the number of rotations of the shaft 23 that is coupled to the motor M1 for driving the upper roller 11, a rate for the rotations of the shaft 29 that is coupled to the motor M2, and a rate for the rotations of the lower roller 13 that is driven by the motor M3.

Consequently, the controller 50 gives the rates for the rotations of R1 r.p.m. for the upper roller 11, R2 r.p.m. for the shaft 29, and R3 r.p.m. for the lower roller 13. The rotation rates of R1, R2, and R3 may be determined based on the traveling speed of V1 of the first conveyor 15, the traveling speed of V2 of the second conveyor 17, the characteristics of the dough 9, or the desired thickness of the rolled dough 9 from the passage between the rollers 11 and 13, etc.

For example, the rotation rate R1 of the upper roller 11 and the rotation rate R2 of the lower roller 13 can be determined in consideration of any change in the traveling speeds between V1 of the first conveyor 15 and V2 of the second conveyor 17 (where V2>V1) in order to prevent all undesirable slipping between the dough 9 and each roller 11 or 13. Alternatively, the rotation rate R1 of the upper roller 11 and the rotation rate R2 of the lower roller 13 may be controlled to be the same as the traveling speed V2 of the second conveyor 17, or the midpoint of the speed between the traveling speed V1 of the first conveyor 15 and the traveling speed V2 of the second conveyor 17, based on the characteristics of the dough 9, or the desired thickness of the rolled dough 9.

The function of the rollers 11 and 13 will now be explained. The incoming dough 9 is fed to the passage between the upper roller 11 and the lower roller 13 from the first conveyor 15, on which the dough 9 is in the form of an elongated mass. The flattening and shaping of the dough 9 into a sheet can then be accomplished through the use of the rollers 11 and 13. The upper roller 11 rolls and stretches the upper surface of the dough 9. Simultaneously, the lower roller 13 rolls and stretches the under surface of the dough 9, while it swings so as to be opposed to and spaced apart therefrom. Thus, the dough 9 that passes through the passage between the rollers 11 and 13 is in a sheet form on the second conveyor 17, without having any undesired wrinkles or tears.

Because the lower roller 13 swings to be opposed to and spaced apart from the dough 9, the dough 9 can be repeatedly pressed and depressed by the rollers 11 and 13. Thus, the dough 9 between the rollers 11 and 13 is temporarily more fluidized than before, such that it can be readily rolled, flattened, and spread by the rollers 11 and 13 into a dough sheet without the need of high pressure. This allows producing a dough sheet with the predetermined thickness without an undesirable broken network structure of gel of, e.g., bread dough. Further the amount of an anti-sticking agent, which typically forms powder material, to be sprinkled on the dough, may be reduced, since the undesirable sticking between the dough and the rollers can be minimized because of their rotating motion.

Although the swinging motion of the lower roller 13 may cause vibrations of the shaft 29, the balancer 30 will keep those vibrations to a minimum to avoid excessive vibrations.

In the first embodiment, the apparatus 1A employs a pair of rollers that includes one primary roller 11 and one secondary roller 13. More specifically, the primary roller 11 and the secondary roller 13 are the upper roller 11, which is located on the upper surface of the incoming dough 9, and the lower roller 13, which is opposed to the primary roller 11 in the vertical direction, to be adapted to the incoming dough 9 in the horizontal direction. Those skilled in the art will realize that this invention need not be limited to this design, but rather it may be changed within the scope of the claims in the appendix. For example, it may be changed as follows:

1) Both the first horizontal conveyor 15 and the second horizontal conveyor 17 can be replaced with vertical conveyors (not shown) such that the incoming dough 9 is conveyed in the vertical direction. In this case, a pair of rollers in which one roller is opposed to the other one in the horizontal direction can be used in order to adapt to the characteristics of the incoming dough 9 in the vertical direction.
2) The first horizontal conveyor 15 can be replaced with a vertical conveyor (not shown) such that the incoming dough 9 is conveyed on the vertical conveyor and proceeds to the second horizontal conveyor 17. In this case, a pair of rollers 11 and 13 can be replaced with a pair of rollers in which the primary roller is opposed to the secondary roller in a tilted direction. The rollers arranged in the tilted direction may be provided at a turning point between the vertical conveyor and the second horizontal conveyor 17.
3) In the above alternative designs, 1) and 2), a pair of rollers may be replaced with multiple pairs, e.g., two or three or more pairs, of rollers.
4) In the above alternative designs, 1), 2), and 3), the primary roller and the secondary roller may also be replaced with a group of mating rollers and a group of secondary rollers such that one group includes at least one roller, while the other group includes multiple rollers that may have more or less rollers than that of the one group.
5) In the above alternative designs, 1) to 4), the diameter of the primary roller (or the primary rollers) may differ from that of the secondary roller (or the secondary rollers).
6) In above alternative design 5), if the diameter of the primary roller (such as the upper roller 11) or the primary rollers is greater than that of the secondary roller (such as the lower roller 13) or the secondary rollers, an area where each counterpart roller contacts the upper surface of the incoming dough 9 can be further extended in the conveying direction of the incoming dough 9. Thus, the load by each secondary roller may be gradually applied to the upper surface of the incoming dough 9 such that the incoming dough 9 will thicken.
7) As a combination of the above alternative designs 4) and 5), one secondary roller (such as the lower roller 13) and multiple (such as three) primary rollers each may have a diameter that is less than that of the secondary roller, and may be provided in order to achieve the same function as alternative design 6). The multiple primary rollers are arranged in a row that is in line with the conveying direction of the first conveyor. In this row, preferably the primary roller at the downstream end is offset such that it becomes in closer contact with the upper surface of the incoming dough 9 than does the primary roller at the upstream end.

Figure 2B:
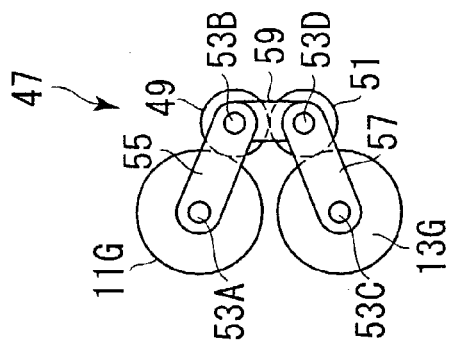
FIG. 2B shows a schematic side view of the primary and secondary rollers and conveyors of the apparatus of FIG. 2A.
Figure 2A:
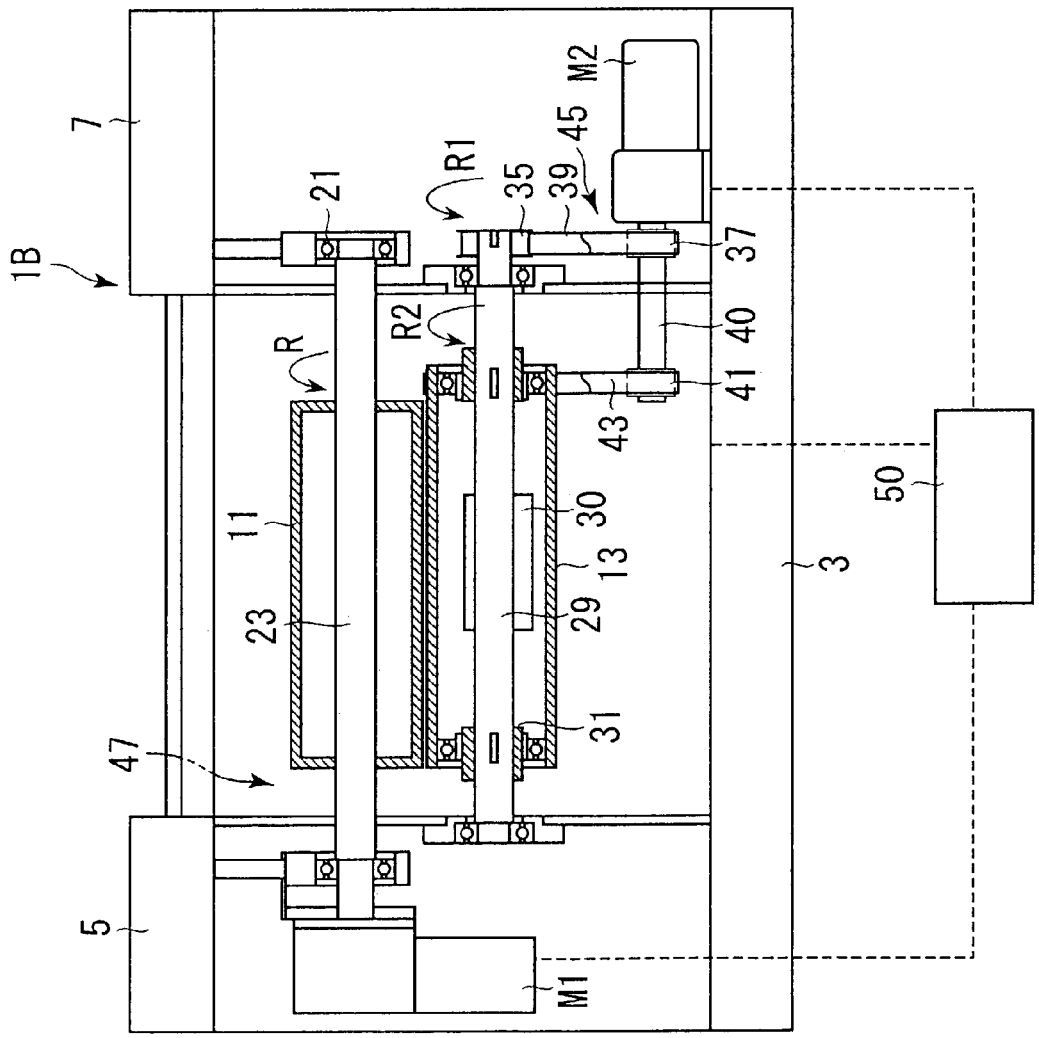
FIG. 2A shows a schematic front view of the apparatus of the second embodiment of the present invention.

FIG. 2A shows the stretching apparatus 1B of the second embodiment of the present invention.

In the second embodiment, the third motor M3 (shown in FIG. 1A), for rotating the lower roller 13 in the first embodiment, is omitted in order to simplify the construction of the stretching apparatus 1B. Instead of the third motor M3, the second motor M2, which rotates the rotary shaft 29 as described in the first embodiment, also rotates the lower roller 13.

To achieve this object, the second motor M2 has an extended output shaft 40. The extended output shaft 40 is coupled to a drive pulley 37a, which has a greater diameter than that of the drive pulley 37 (shown in FIG. 1A) in the first embodiment. The extended output shaft 40 of the second motor M2 is also coupled to the drive pulley 41, which is coupled to the third motor M3 in the first embodiment.

As in the first embodiment, the first endless belt 39 is entrained around the driven pulley 35 and the drive pulley 37a. In the second embodiment, however, the drive pulley 37a and the first endless belt 39 constitute a transmission 45 between the driven pulley 35 and the drive pulley 37a, since the drive pulley 37a has a greater diameter.

Then, just the second motor M2 can drivingly rotate the lower roller 13, as well as the rotary shaft 29.

The drive pulley 37a is preferably a V-pulley provided to the transmission 45 such that the ratio of the rotation speeds of the upper roller 13 to the rotary shaft 29 can be varied without limitation.

The construction of the stretching apparatus 1B can be simplified, since just two motors, M1 and M2, are needed.

Alternatively, the stretching apparatus 1B of the second embodiment can be further simplified to omit the first motor M1 by coupling the upper roller 11 and the lower roller 13 with an appropriate transmitting means.

FIG. 2B shows one example of such a transmitting means as a gearing mechanism 47. In the gearing mechanism 47, an upper gear 11G and a lower gear 13G are coupled to the upper roller 11 and the lower roller 13 (neither roller is shown in FIG. 2B). The upper gear 11G is steadily meshed with a first intermediate gear 49, while the lower gear 13G is steadily meshed with a second intermediate gear 51, which is steadily meshed with the first intermediate gear 49. The upper gear 11 has a centered pivot pin 53A, while the first intermediate gear 49 has a centered pivot pin 53B, which is pivotally connected to the centered pivot pin 53A via a first linkage arm 55. Similarly, the lower gear 13G has a centered pivot pin 53C, while the second intermediate gear 51 has a centered pivot pin 53D, which is pivotally connected to the centered pivot pin 53C via a second linkage arm 57. Further, the centered pivot pin 53B of the first intermediate gear 49 is pivotally connected to the centered pivot pin 53D of the second intermediate gear 51 via a first linkage arm 59.

With the gearing mechanism 47, the rotation of the lower roller 13 by the second roller M2 can be transmitted to the upper roller 11 through the lower gear 13G, the second intermediate gear 51, the first intermediate gear 49, and the upper gear 11G. Thus, the first motor M1 for rotating the upper roller 11 can be omitted.

The rotation speed of the upper roller 11 can be the same as that of the lower roller 13 by providing a design where the diameter of the upper gear 11G is the same as that of the lower gear 13G, and the diameter of the first intermediate gear 49 is the same as that of the second intermediate gear 51. In contrast, the rotation speed of the upper roller 11 may differ from that of the lower roller 13, in relation to diameters of the differentials of the gears.

Alternatively, another transmitting means may also be considered, rather than the gearing mechanism 47. For an example of a simplified transmitting means, a twisted endless belt (not shown) may be entrained around the upper roller 11 and the lower roller 13 in the form of an "8."

In the second embodiment, the arrangement of the rollers 11 and 13 and conveyors 15 and 17 may be changed to be similar to those listed above in 1) to 7), as in the first embodiment.

Figure 3:
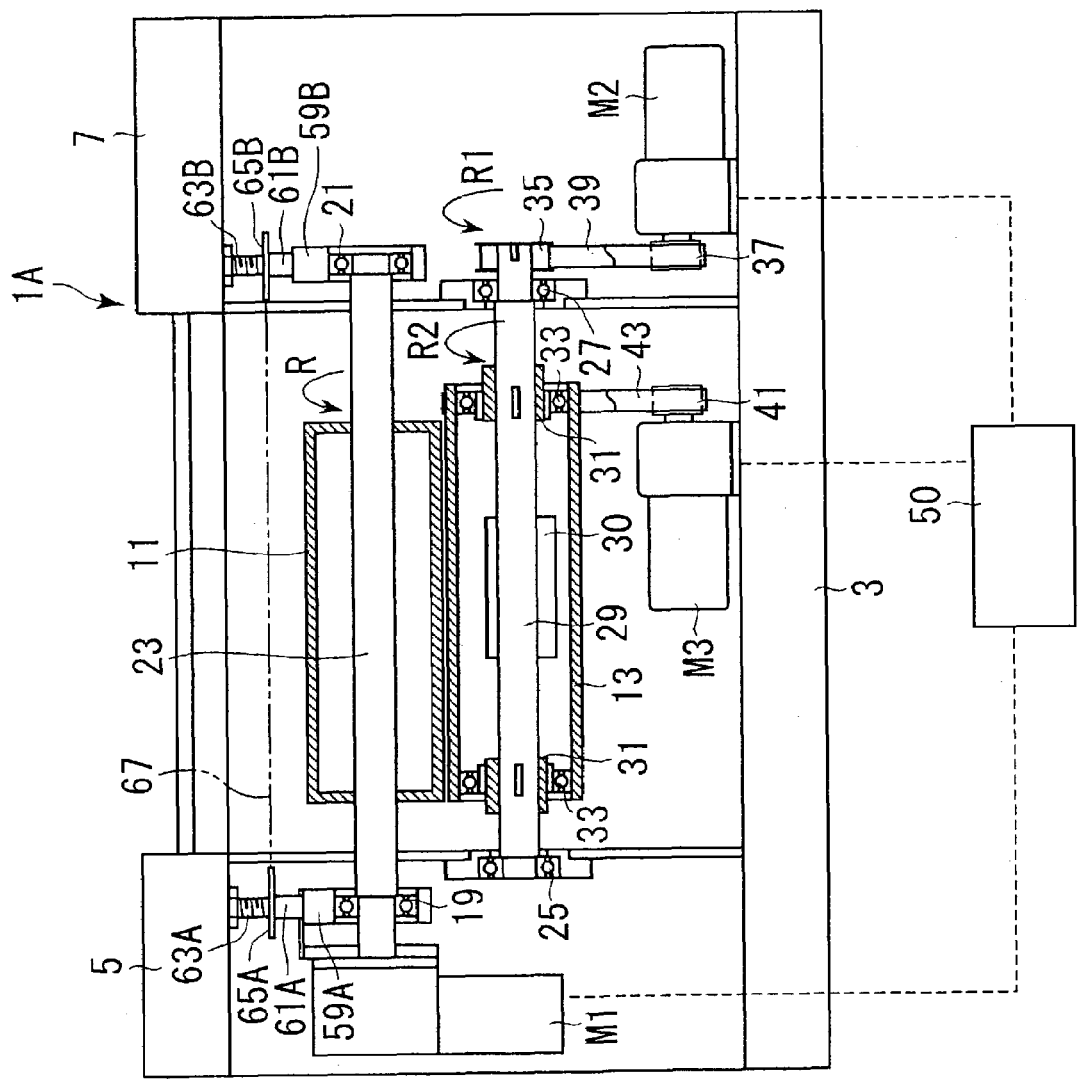
FIG. 3 shows a schematic front view of the apparatus of the third embodiment of the present invention.

Referring now to FIG. 3, a stretching apparatus 1C of the third embodiment of the invention is illustrated, in which the gap between the upper roller 11 and the lower roller 13 is adjustable to control the thickness of the incoming dough 9. In the same manner as in the first and second embodiments, immediately downstream from the first conveyor 15 the incoming dough 9 passes through the passage between the upper roller 11 and the lower roller 13 of the apparatus 1C. It is at this point that the thickness of the incoming dough 9 can be controlled.

In the first embodiment, shown in FIG. 1A, the bearings 19 and 21 of both ends of the rotary shaft 23 of the upper roller 11 are directly suspended from the frames 5 and 7. In contrast, the bearings 19 and 21 of the third embodiment are mounted on bearing blocks 59A and 59B, whose upper ends have nuts 61A and 61B. The nuts 61A and 61B can be adjustably fastened on studs 63A and 63B that are vertically suspended from the frameworks 5 and 7. Regarding the fastened positions of the nuts 61A and 61B relative to the studs 63A and 63B, the level of the rotary shaft 23 and thus the upper roller 11 can be adjusted, and then the gap between the upper roller 11 and the lower roller 13 can be adjusted. The thickness of the incoming dough 9 can be controlled by adjusting the gap between the upper roller 11 and the lower roller 13.

Because the rotary shaft 23 of the upper roller 11 is supported at two places (at both ends of it), any uneven fastening of the nuts 61A, 61B and the studs 63A, 63B must be avoided. To achieve this object and thus to evenly turn the two nuts 61A, 61B in unison, the nuts 61A and 61B are preferably provided with sprockets 65A and 65B. Further, an endless chain 67 is entrained about the sprockets 65A and 65B so as to turn them in the same direction in unison. Therefore, the levels of the two bearing blocks 59A and 59B, and thus both ends of the rotary shaft 23, can be adjusted simultaneously. Consequently, the desired gap between the upper roller 11 and the lower roller 13 can be obtained to facilitate the control of the thickness of the incoming dough 9.

The sprockets 65A, 65B and the endless chain 67 may be replaced with other suitable means that enables the two nuts 61A, 61B to evenly turn in unison.

In the third embodiment, the gap between the upper roller 11 and the lower roller 13 is adjusted by adjusting the level of the rotary shaft 23 of the upper roller 11. Alternatively, either the height of the rotary shaft 23 of the upper roller 11 or the height of the rotary shaft 29 of the lower roller 13 (or both) may be adjustable. The level of the rotary shaft 29 of the lower roller 13 can be adjusted by providing the same arrangement for the rotary shaft 23 as described above and as illustrated in FIG. 3.

In the third embodiment, an arrangement of the rollers 11 and 13 and conveyors 15 and 17 may be changed similarly to those in listed above in 1) to 7), for the first embodiment.

Figure 4A:
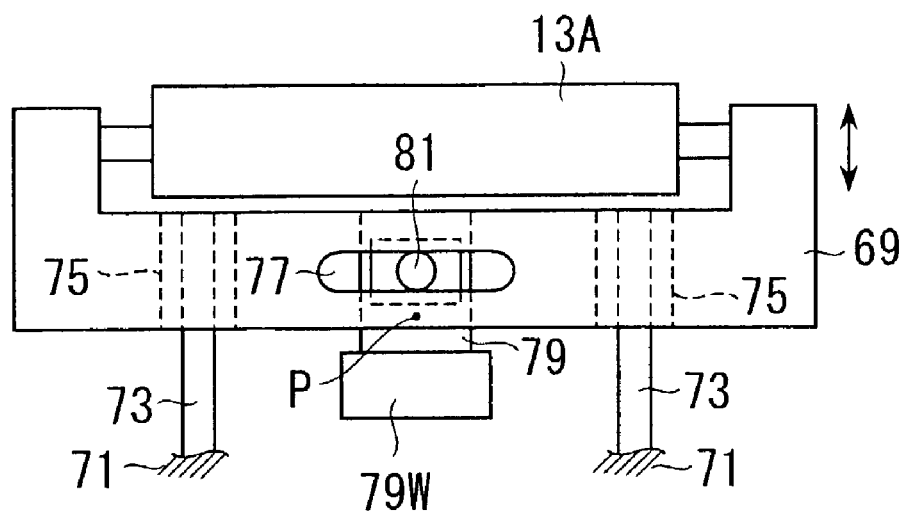
FIG. 4A shows a schematic front view of an alternative secondary roller that can be replaced with that of the first, second, and third embodiments.
Figure 4B:
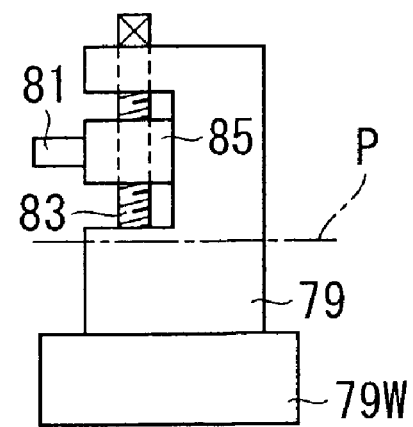
FIG. 4B shows a schematic side view of the rotating member of FIG. 4A.

FIGS. 4A and 4B show an alternative secondary roller 13A that can be replaced with the lower roller (or the secondary roller) 13 of the first, second, and third embodiments. FIGS. 4A and 43 are schematics and not to scale. This roller 13A can be swung such that it is opposed to and spaced apart from the primary roller (or the upper roller) 11. The secondary roller 13A, which is rotated by a motor (not shown), is rotatably supported by a bracket 69. The bracket 69 is vertically and slidably mounted on guiding columns 73, which are attached to a fixed member (e.g., a frame) 71, via slidable elements, such as ball bushings 75. The bracket 69 has a slot 77, which parallels the longitudinal centered axis of the roller 13A. The slot 77 receives a pin 81 of a rotating member 79, which is rotated about its rotating axis P by means of a motor (not shown). The rotating member 79 also has a balancing weight 79W to balance the secondary roller 13A and the bracket 69, etc.

When the rotating member 79 rotates about its rotating axis P, the pin 81 rotates and thus moves along with the slot 77 so as to cause the vertical vibrating motion of the bracket 69. Although the vertical vibrating bracket 69 is schematic (shown in FIG. 4A), in practice the range of the vertical vibrating motion of it is several millimeters.

As shown in FIG. 4B, the pin 81 preferably protrudes from a nut 85 on a radially threaded stud 83 on the rotating member 79. Thus, the radial length between the pin 81 and the rotating axis P can be varied by adjusting the position of the nut 85 on the radially threaded stud 83. This allows the range of the vibrating motion of the secondary roller 13A to be adjusted, based on the characteristics of the dough 9, or the desired thickness of the rolled dough.

FIGS. 5A and 5B show a stretching apparatus 1D of the four embodiments of the present invention in which an alternative primary roller or upper roller 11A is employed instead of the primary roller 11 of the first embodiment.

As shown in FIGS. 5A and 5B, some parts are denoted by numerals that are the same as those of the first embodiment to show that their arrangements and functions are also the same as those of the first embodiment.

The rotary shaft 23 and its associated mechanism of the primary roller 11A are the same as those of the primary roller 11 of the first embodiment, and denoted by the same numerals as in the first embodiment.

The primary roller 11A includes a pair of circular disks 11P, which define both ends of the primary roller 11A, and a plurality of planetary rollers 11R, which substantially parallel the rotary shaft 23, located between the circular disks 11P. Each planetary roller 11R is rotatably supported by the circular disks 11P such that the planetary rollers 11R are arranged with even intervals in the circumference about the rotary shaft 23. That is, the rotating surface of the primary roller 11A forms the orbit for the planetary rollers 11R. Thus, each planetary roller 11R revolves about the rotary shaft 23 in the traveling direction of the incoming dough 9 when the rotary shaft is rotated clockwise (denoted by R in FIG. 5B) by the first motor M1 and its associated parts. Each revolving planetary roller 11R also rotates on its own axis by contacting the upper surface of the incoming dough 9. This allows the incoming dough 9 to be stretched as well, reducing its thickness by passing it through the gap (between the planetary roller 11R and the secondary roller 13) that is less than the initial thickness of the incoming dough 9.

Preferably, the primary roller 11A includes an appropriate member to facilitate or activate the rotations of the planetary rollers 11R. For example, as shown in FIG. 5B, the primary roller 11A may be shifted to one of its ends (at the left side in FIG. 5B) relative to the secondary roller 13 so as to provide a space for installing a member, such as a belt 22, to activate the rotations of the planetary rollers 11R. When one planetary roller 11R contacts the upper surface of the incoming dough 9, one end (at the left side in FIG. 5B) of the planetary roller 11R also interferes with the belt 22 so as to activate the rotation of it. This arrangement allows the reduction of the undesired slipping between the planetary roller 11R and the upper surface of the incoming dough 9. Consequently, the undesired wrinkles or tears of the upper surface of the incoming dough 9 may be sufficiently avoided and thus the desired form of the sheet of the incoming dough can be produced.

A comparison of the primary roller 11A of the fourth embodiment with the primary roller 11 of the first embodiment shows that the primary roller 11A includes a plurality of the planetary rollers 11R, whereas the primary roller 11 consists of a single roller. Thus the primary roller 11A of the fourth embodiment has some characteristics that differ from those of the primary roller 11 of the first embodiment, although the fourth embodiment has functions that are similar to those of the first embodiment.

Referring to FIG. 5A, the functions of the primary roller 11A will be explained in more detail. In the same manner as in the first embodiment, the secondary roller 13 now rotates and swings to be opposed to and spaced apart from the primary roller 11A. At this time, the primary roller 11A also rotates in the same manner as the primary roller 11 of the first embodiment. The gap between the primary roller 11A and the secondary roller 13 is minimized when one planetary roller 11R is positioned on an imaginary vertical axis (not shown) that is close to the centers of the rotary shafts 23 and 29. This planetary roller 11R then gradually moves from the imaginary vertical axis to the conveying direction of the incoming dough 9 by means of the rotation of the primary roller 11A. At this time, the secondary roller 13 swings to gradually be spaced apart from the primary roller 11A, which swinging is caused by the swinging motion of the secondary roller 13. Then the gap between the secondary roller 13 and the primary roller 11 (or the one planetary roller 11R, which has just been moved from the imaginary vertical axis) is lightly increased to be greater than the minimal gap. Consequently, the gap between the primary roller 11A and the secondary roller 13 alternates between the minimal gap and the slightly increased gap, to roll the incoming dough 9.

Then what is substantially the mid-point of the interval between the adjacent planetary rollers 11R, which are positioned on the imaginary vertical axis and the secondary roller 13, swings to gradually be close to the primary roller 11A. This motion allows the incoming dough 9 to be slightly lifted between the primary roller 11A and the secondary roller 13 so as to form a slightly convex shape for its upper surface, to temporarily further fluidize it such that it can be readily rolled, flattened and spread by the rollers 11A and 13.

Alternatively, the upper surface of the incoming dough 9 between the primary roller 11A and the secondary roller 13 may alternate between a slightly convex shape (at this time the opposed surface of it has a slightly concave shape) and a slightly concave shape (at this time the opposed surface of it has a slightly convex shape) by adjusting the range of the swinging motion of the secondary roller 13.

Similarly, the mechanism for swinging the secondary roller 13 may be provided to the primary roller 11A instead of the secondary roller 13. In such an arrangement, when the primary roller 11A swings to be close to the secondary roller 13 to slightly lower the incoming dough 9, the upper surface of the incoming dough has a slightly concave shape.

The primary roller 11A and the secondary roller 13 may be exchanged for each other, if desired.

The swinging motion of the secondary roller 13 provides the beating action to the incoming dough 9. Further, because the secondary roller 13 swings, the gap between the primary roller 11A and the secondary roller 13, and thus the intensity of the beating action, can be randomly varied.

The rotation speed of the primary roller 11A and the number of vibrations of the secondary roller 13 may be changed relative to the conveying speed of the incoming dough 9 based on the characteristics of it.

The arrangement of the rollers and conveyors 15 and 17 shown in FIG. 5A may be changed to be similar to those listed in 1) to 7) above in the first embodiment.

Figure 6A:
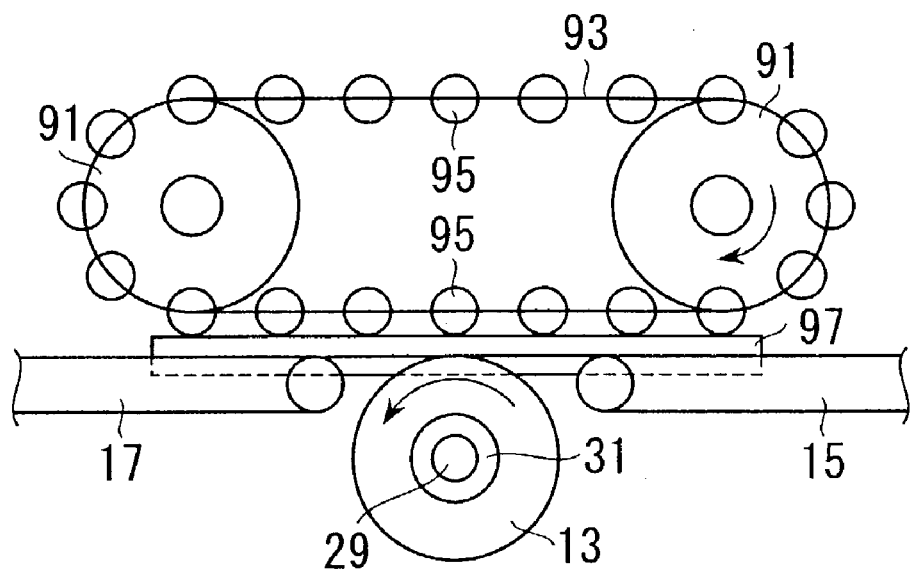
FIG. 6A shows a schematic side view of an alternative primary roller that can be replaced with that of the fourth embodiment, wherein the alternative primary roller has a plurality of elongated planetary rollers in substantially an elliptical orbit.
Figure 6B:
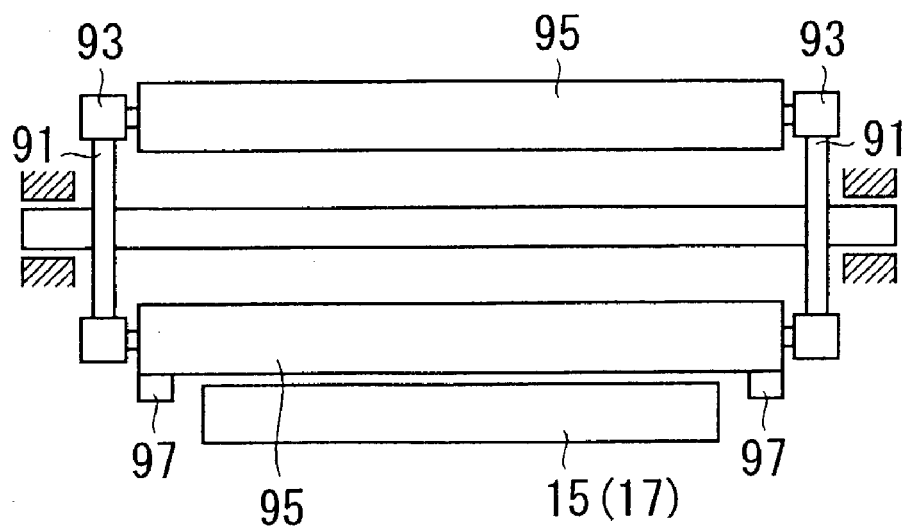
FIG. 6B shows a schematic front view of the alternative secondary roller of FIG. 6A.

FIGS. 6A and 6B show an alternative primary roller 11B having a plurality of elongated planetary rollers 95 in substantially an elliptical orbit. The primary roller 11B includes a pair of endless chains 93 entrained around the pair of the end sprockets 91, which are arranged in the conveying direction. Both ends of each elongated planetary roller 95 are rotatably supported by the endless chains 93 such that the elongated planetary rollers 95 are arranged at equal intervals.

Preferably, a pair of guiding members 97, such as rails, are provided near both lateral sides of the conveyors 15 and 17 so as to guide and activate the rotation of the planetary rollers 95.

Clearly, the primary roller 11B (FIGS. 6A and 6B) has a longer orbit than the primary roller 11A (FIGS. 5A and 5B). It shows that the former has a more extended range in which the planetary rollers 95 apply the forces for spreading and rolling the dough 9 than does the latter. With such a longer orbit, two or more secondary rollers, each similar to the secondary roller 13, may be provided in parallel. In this case, an additional conveyor or conveyors (not shown) may be provided between the adjacent secondary rollers.

Although the orbit of the planetary rollers 95 is shown as an elliptical orbit, it may be a rectangular orbit, or a triangular orbit, etc. In any case, the planetary rollers 95, which are opposed to the secondary roller 13 and the conveyors 15 and 17, are preferably arranged such that their orbits downwardly incline from upstream to downstream.

Figure 7A:
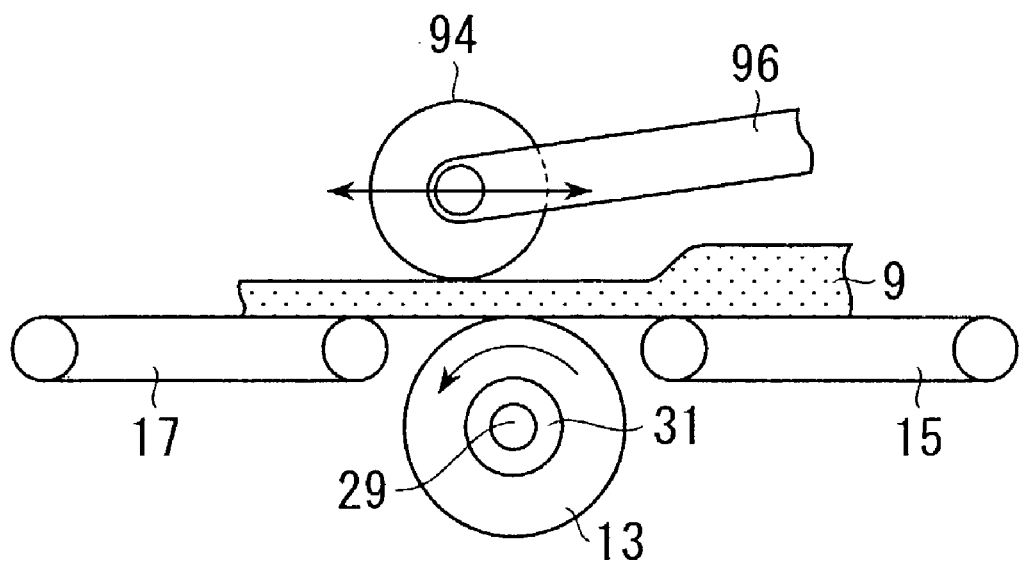
FIG. 7A shows a schematic side view of a further alternative primary roller that can be replaced with that of the fourth embodiment.
Figure 7B:
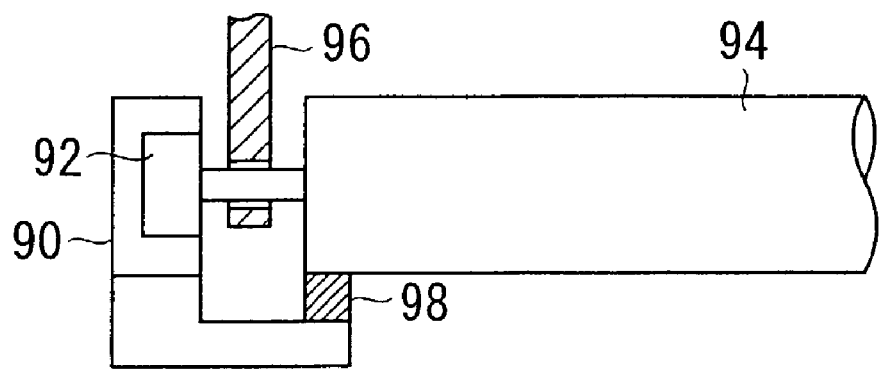
FIG. 7B shows a schematic front view of the secondary roller of FIG. 7A.

FIGS. 7A and 7B show another alternative primary roller 94. A pair of guiding rails 90 (just one is shown in FIG. 7B) are provided at the lateral sides of the passage of the incoming dough 9. Each guiding rail 90 has an elongated recess, which slidably receives a sliding member 92, which recesses oppose each other. The corresponding sliding member 92 rotatably supports each end of the primary roller 94. (Although FIGS. 7A and 7B show just one primary roller 94, a plurality of such rollers is provided.) A pair of arms 96 (just one is shown in FIGS. 7A and 7B) is provided for each primary roller 94. One end of each arm 96 is connected to the sliding member 92, and other end of it is drivingly connected to a reciprocating mechanism, such as a crank mechanism (not shown), so as to provide the sliding motion of the sliding member 92 within the elongated recess. A pair of guiding members 98 (just one is shown in FIG. 7B) that are similar to the guiding member 51 in FIGS. 6A and 6B are provided near both lateral sides of the conveyors 15 and 17 so as to guide and activate the rotations of the primary rollers 94.

When the reciprocating mechanism reciprocately moves the sliding members 92 within the guiding rails 90 in the conveying direction of the dough 9, the primary rollers 57 actively rotate in the conveying direction of the dough 9 by contacting the guiding members 98. Consequently, the active rotating of the primary rollers 94 in the conveying direction of the dough 9 cooperates with the vibrating and rotating motion of the secondary roller 13 to facilitate the spreading and rolling of the dough 9.

Although the invention has been shown in several forms, it would be obvious to those skilled in the art that various changes and modifications can be made without departing from the spirit and scope of the appended claims.

The invention claimed is:

1. An apparatus for stretching and rolling a mass of a strip of food dough to form a dough sheet, comprising:
   first conveying means for continuously conveying a mass of a strip of food dough thereon along a traveling direction at a first traveling speed, wherein the traveling direction is substantially parallel to a length of the mass of the strip of food dough;
   at least one primary elongated roller supported by a rotary shaft and at least one secondary elongated roller supported by a rotary shaft, which rollers are substantially orthogonal to the traveling direction, and which are opposed to each other so as to provide a gap therebetween for receiving the incoming mass of the strip of dough from the first conveying means, said gap forming a passage for the mass of the strip of food dough between the rollers;
   a first motor for rotating said primary elongated roller in the traveling direction of the incoming mass from said first conveying means;
   means for frequently swinging at least one of the primary elongated roller and the secondary elongated roller, wherein the frequently swinging means includes a second motor and the frequently swinging means converts rotations of the second motor into a force that causes said at least one of the primary elongated roller and the secondary elongated roller to approach and retract from the other of the primary elongated roller and the secondary elongated roller, whereby the incoming mass of the strip of food dough in the gap is stretched and rolled to form a dough sheet;
   a third motor for rotating said secondary elongated roller in the traveling direction of the incoming mass from said first conveying means;
   second conveying means for receiving the stretched and rolled dough sheet from the gap and conveying the dough thereon at a second traveling speed; and
   controlling means for controlling rotation rates of the of the first and third motors and a rotation rate of the second motor based on the first traveling speed of the first conveying means and the second traveling speed of the second conveying means,
   wherein the frequently swinging means alternates the gap between a first gap and a second gap, wherein the difference in size between the first and second gap is slight,
   wherein the frequently swinging means further includes an eccentric member located between at least one of the primary and secondary elongated rollers and the rotary shaft of said one elongated roller, the eccentric member being mounted on said rotary shaft of said one elongated roller such that said one elongated roller approaches and retracts from the other elongated roller as said rotary shaft of said one elongated roller rotates,
   wherein a balancer is provided on said rotary shaft of said one elongated roller to avoid excessive vibrations of said rotary shaft, and
   wherein said controlling means controls at least one of said first and third motors and also controls said second motor such that a rotation rate of an eccentric rotation of said one rotary shaft of said one elongated roller is greater than a rotation rate of said one rotary shaft.

2. The apparatus of claim 1, wherein one of the primary elongated roller and the secondary elongated roller is provided with said frequently swinging means, wherein said one elongated roller is arranged such that said one elongated roller can be projected in the path of the traveling food dough, while the other elongated roller rotates in a predetermined orbit and moves relative to said one elongated roller in the traveling direction or its reverse direction, or both, of the food dough such that the food dough alternates between a state in which the upper surface and the lower surface form a convex shape and a concave shape, respectively, and a state in which the upper surface and the lower surface form a concave shape and a convex shape, respectively.

3. The apparatus of claim 1, wherein said eccentric member includes means for variably adjusting the radial length between the rotating center of said eccentric member and said rotary shaft on which said eccentric member is mounted to allow adjusting the range of the frequently swinging motion of the corresponding elongated roller.

* * * * *